(12) United States Patent
Ezzi

(10) Patent No.: US 11,871,742 B2
(45) Date of Patent: Jan. 16, 2024

(54) PORTABLE AND COLLAPSIBLE FOLDING HUNTING SEAT

(71) Applicant: Todd S. Ezzi, North Little Rock, AR (US)

(72) Inventor: Todd S. Ezzi, North Little Rock, AR (US)

( * ) Notice: Subject to any disclaimer, the term of this patent is extended or adjusted under 35 U.S.C. 154(b) by 525 days.

(21) Appl. No.: 17/060,110

(22) Filed: Oct. 1, 2020

(65) Prior Publication Data

US 2021/0100236 A1    Apr. 8, 2021

Related U.S. Application Data

(60) Provisional application No. 62/909,456, filed on Oct. 2, 2019.

(51) Int. Cl.
*A01M 31/02*    (2006.01)

(52) U.S. Cl.
CPC .................. *A01M 31/02* (2013.01)

(58) Field of Classification Search
CPC .................................................... A01M 31/02
See application file for complete search history.

(56) References Cited

U.S. PATENT DOCUMENTS

| | | | |
|---|---|---|---|
| 440,568 A | 11/1890 | Hebard | |
| 2,738,608 A | 3/1956 | Buzzini | |
| 3,871,482 A * | 3/1975 | Southard | A01M 31/02 |
| | | | 182/187 |
| 4,061,202 A * | 12/1977 | Campbell | E06C 7/16 |
| | | | 182/20 |
| 4,120,379 A * | 10/1978 | Carter | A01M 31/02 |
| | | | 182/187 |
| 4,124,094 A * | 11/1978 | Cande | A01M 31/02 |
| | | | 182/20 |
| 4,191,111 A | 3/1980 | Emmert | |
| 4,727,961 A * | 3/1988 | Dawson | A01M 31/02 |
| | | | 182/187 |
| 4,776,503 A * | 10/1988 | Sink | A01M 31/025 |
| | | | 182/187 |
| 4,974,407 A | 12/1990 | Rowe | |
| 4,977,734 A | 12/1990 | Rowe | |
| 5,186,276 A * | 2/1993 | Craig | A01M 31/02 |
| | | | 182/187 |
| 5,409,083 A | 4/1995 | Thompson | |
| 5,581,929 A | 12/1996 | Molloy | |

(Continued)

*Primary Examiner* — Colleen M Chavchavadze
(74) *Attorney, Agent, or Firm* — Stephen D. Carver

(57) ABSTRACT

A portable and foldable hunting stand comprises a rigid frame for temporary attachment to a tree that supports a selectively deployable platform adapted to be folded between a generally vertical transportation orientation and a generally horizontal, deployed position. A first platform strut is pivoted with an axis of rotation forming an acute angle relative to the frame. A second platform strut is pivoted relative to said frame with an axis of rotation forming a similar acute angle relative to the frame, but which extends away from the first strut. The platform struts outwardly diverge when the stand is foldably deployed, forming an obtuse angle between them, yielding a generally trapezoidal configuration. A selectively deployable traversing strut may extend between the platform struts in deployment. When the stand is folded for transportation, the platform struts are retracted to assume a parallel vertical, orientation.

1 Claim, 12 Drawing Sheets

(56) References Cited

U.S. PATENT DOCUMENTS

| | | | |
|---|---|---|---|
| 5,853,066 A * | 12/1998 | Gohn | A01M 31/02 182/20 |
| 5,975,389 A * | 11/1999 | Braun | A45F 4/02 224/916 |
| 6,161,807 A | 12/2000 | Steiner | |
| 6,196,354 B1 | 3/2001 | Anthony | |
| 7,055,563 B2 | 6/2006 | Logan | |
| 7,377,361 B1 * | 5/2008 | Tschida | A01M 31/02 182/187 |
| 7,497,269 B2 | 3/2009 | Jagow | |
| 8,272,479 B1 * | 9/2012 | Leach | A01M 31/02 182/187 |
| 9,232,783 B2 | 1/2016 | Blackwell | |
| 2002/0108481 A1 | 8/2002 | Logan | |

\* cited by examiner

PORTABLE AND COLLAPSIBLE FOLDING HUNTING SEAT

CROSS REFERENCE TO RELATED APPLICATIONS

This utility application is based upon, and claims priority from, prior U.S. Provisional Application Ser. No. 62/909,456, filed Oct. 2, 2019, and entitled "Portable and Collapsible Folding Hunting Seat," by inventor Todd S. Ezzi.

BACKGROUND OF THE INVENTION

I. Field of the Invention

The present invention relates generally to portable seats for supporting a hunter, an observer, or a pet such as a hunting dog, when in the woods. More particularly, the present invention relates to portable and collapsible tree stands that may be carried in a compact, folded-together orientation, which can subsequently be attached to a tree and thereafter deployed to provide a supporting surface for use as a seat, a stand or the like. Prior art hunting stands of the general type disclosed herein may be classified in USPC Class 43, Subclasses 12 and 13, and in CPC Classes E06C, Subclass 1/381 and A01M subclass 31/02.

II. Description of the Prior Art

Hunting stands, often referred to as deer stands, have long been recognized and appreciated by those skilled in the hunting arts. Portable hunting stands are often configured to firmly and safely engage a tree, while providing a comfortable seat for a hunter, an observer, or other outdoorsman when in the woods. Where deer are hunted in dense forests, as is usually the case in Arkansas, Louisiana, and Mississippi, it is advantageous for a hunter to elevate himself above ground, such that a large, relatively unobstructed view is provided. Typical hunting stands stands often include some form of platform assembly that provides a generally planar seat or platform, and optionally a foot rest, which may be coupled by various support structures to a tree trunk. Support for the stand can be provided by encircling straps or chains that surround a tree trunk and firmly engage it.

Stands of the "permanent" type resemble small dwellings or buildings that are self-standing and often firm enough to be erected without support from a tree. Smaller tree-mounted stands including long, ladder-like legs can resemble permanent stands in length and comfort, but these can be rather heavy and cumbersome and are not generally portable. Consequently their parts are often separately transported to a desired tree for deployment and erection once all the parts have been delivered. Often this requires multiple trips by the user.

Tree stands provide several advantages. During the long hours of a typical deer hunt, for example, comfort is an attribute. Tree stands can help camouflage the hunter's position, making the hunt more successful. At the same time, safety must be assured, and subsequent ease in shooting, along with comfortable and quick ingress and egress characteristics are needed.

U.S. Pat. No. 440,568 issued Nov. 11, 1890 and U.S. Pat. No. 2,738,608 issued Mar. 20, 1956 each disclose folding fish landing nets with outwardly diverging arms. Similarly, U.S. Pat. No. 5,581,929 issued Dec. 10, 1996 discloses a fishing net that has two diverging arms for supporting a net portion.

U.S. Pat. No. 4,061,202 issued Dec. 6, 1977 discloses a hunting stand adapted to be mounted to a supporting tree at a selected distance above ground. A platform area where the user may position himself is supported, in part by a sectional ladder extending to ground. The various elements of the hunting stand are modular, and can be compacted into a package allowing portability.

U.S. Pat. No. 4,191,111 issued Mar. 4, 1980 discloses a bench construction with collapsible and folding leg structure. The legs can be retracted to a folded position under the bench when a brace is manually released from the legs and moved toward the underside of the bench.

U.S. Pat. No. 4,974,407 issued Dec. 4, 1990 discloses an agricultural implement, namely a hay rake, with a pair of spaced apart, deployable arms supporting a plurality of finger-wheel rakes. Each arm is pivoted at an axis forming an angle relative to the vertical and to the horizontal. A power actuator rotates the rakes about the axis for rotating the rakes downwardly, outwardly and backwardly for moving the rakes to a rake position and rotates the rakes upwardly, inwardly and forwardly to raise the rakes to a transport position.

Similarly, U.S. Pat. No. 4,977,734 issued Dec. 18, 1990 provides another foldable hay rake whereby pivoting enables rotation of the rakes between a downward and outward rake position and an upward and inward transport position.

U.S. Pat. No. 7,497,269 issued Mar. 3, 2009 also shows an implement with folding wing portions.

U.S. Pat. No. 5,409,083 issued Apr. 25, 1995 discloses a modular and portable tree stand adapted to be secured to a tree or pole which provides a flat, planar surface for supporting at least one person.

U.S. Pat. No. 6,161,807 issued Dec. 19, 2000 discloses a portable support stand sized to fit over a bed or chair, which is adapted to collapse with pivoting legs that may be compactly folded. The foldable legs are mutually divergent.

U.S. Pat. No. 6,196,354 issued Mar. 6, 2001 discloses a portable tree stand assembly with a seat, a platform and a position adjustment arrangement supported by a tree via a support bracket.

U.S. Pat. No. 7,055,563 issued Jun. 6, 2006 discloses a portable, collapsible table. Supporting legs can be moved between diverging supporting positions, a folding position, and a storage position.

U.S. Pat. No. 7,377,361 issued May 27, 2008 discloses a collapsible tree stand for use in hunting and observing wildlife that includes a collapsible platform and collapsible seat support assembly. Several pivot joints permit multiple platform sections and frame members fold. An adjoining seat support and/or seat assemblies fold with the platform to widths that accommodate transport.

U.S. Pat. No. 9,232,783 issued Jan. 12, 2016 provides an adjustable platform assembly for attachment to a tree for providing a hunting dog perch or a seat for a hunter. A frame member attached to the tree is pivotally adjustable about a first axis that extends generally perpendicular to the tree and perpendicular to a first plane. A second frame member is attached to the first frame member and is adjustable about a second axis that extends generally parallel with the first plane. A platform attached to the second frame member can be adjusted to a desired horizontal orientation by adjusting the first and second frame members about the first and second axes.

U.S. Pat. Application No. 2002/0108481 published Aug. 15, 2002 shows a collapsible table assembly with legs that move between a supporting position, a folding position, and a storage position.

None of the foregoing stand or hunting patents disclose a foldable, portable hunting tree stand or seat that can be transformed between compact, collapsible and/or transportable configurations and a user-deployed hunting configuration wherein outwardly diverging, foldably deployable arms provide a support surface whose dimensions are larger than the dimensions of the stand when in the retracted, transportation configuration.

SUMMARY OF THE INVENTION

This invention provides a portable, lightweight and foldable tree stand that provides a quickly deployable platform for supporting an outdoorsman such as a hunter or the like, or a hunting dog, in a convenient location for hunting or observing the surrounding proximate a suitable tree. A pair of uniquely hinged platform struts that support the seat can be folded downwardly to an outwardly diverging position, forming a generally trapezoidal seat. For transportation, the stand assumes reduced dimensions. The platform struts can be folded upwardly where they converge during retraction, and they foldably transform to a substantially vertical, parallel position for convenient carrying of the stand.

Thus a basic object is to provide a portable, easily deployed hunting stand.

Another object is to provide a stand of the character described that is easily transportable and readily deployable at a hunting location.

It is also an object to provide a lightweight, easily transported tree stand that is not bulky or irregular, so it may be transported upon ones back without clumsily engaging tree branches or other obstacles while the user is walking.

Thus it is also an object is to provide a stand of the character described that is readily moved through wooded areas without impeding the user or snagging or hooking tree branches or the like.

A related object is to provide a portable and foldable tree stand that may be quickly transported and then installed without delay upon a desired tree.

It is also an object to provide a portable seat of the character described that may be collapsed to a compact, transportable position.

A related object is to provide a stand of the character described that securely and safely holds a hunter or other user, or a hunting dog or pet, in a comfortable and safe orientation facilitating observation of the surrounding region.

Another important object is to provide a portable, foldable tree stand for supporting hunters, outdoorsmen, bird watchers, or others, including pets, at a convenient elevated position proximate a tree, upon a comfortable, enlarged seat.

Conversely, an important object is to provide a tree stand of the character described that may be quickly, foldably retracted into a convenient, non-bulky carrying position after removal from a tree.

Another basic object is to provide a suitable tree stand that is safe, comfortable, easily deployed, and substantially concealable.

A similar important object is to provide a stand that is easily folded between tree-engaging positions and relatively compact, transportable dispositions after use.

A further object is to provide a portable tree stand that is capable of one-man erection without the use of special tools or equipment.

A still further object is to provide a stand of the character described that can readily provide a support surface for rest and comfort by a hunting dog.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION OF THE SEVERAL VIEWS OF THE DRAWINGS

Figure 1:
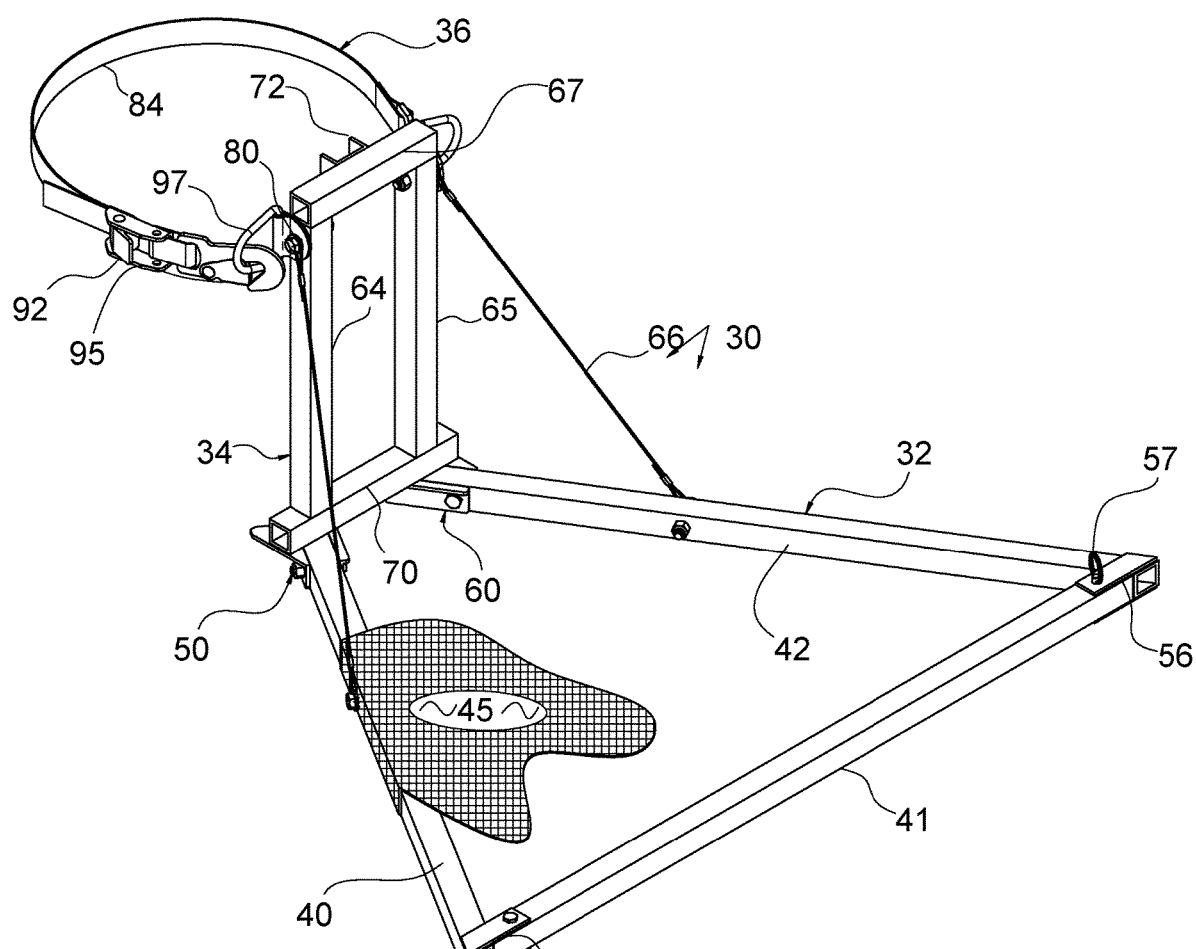
FIG. 1 is a frontal, left isometric view of my new stand, with portions thereof broken away for brevity, showing it folded to a deployed configuration.
Figure 2:
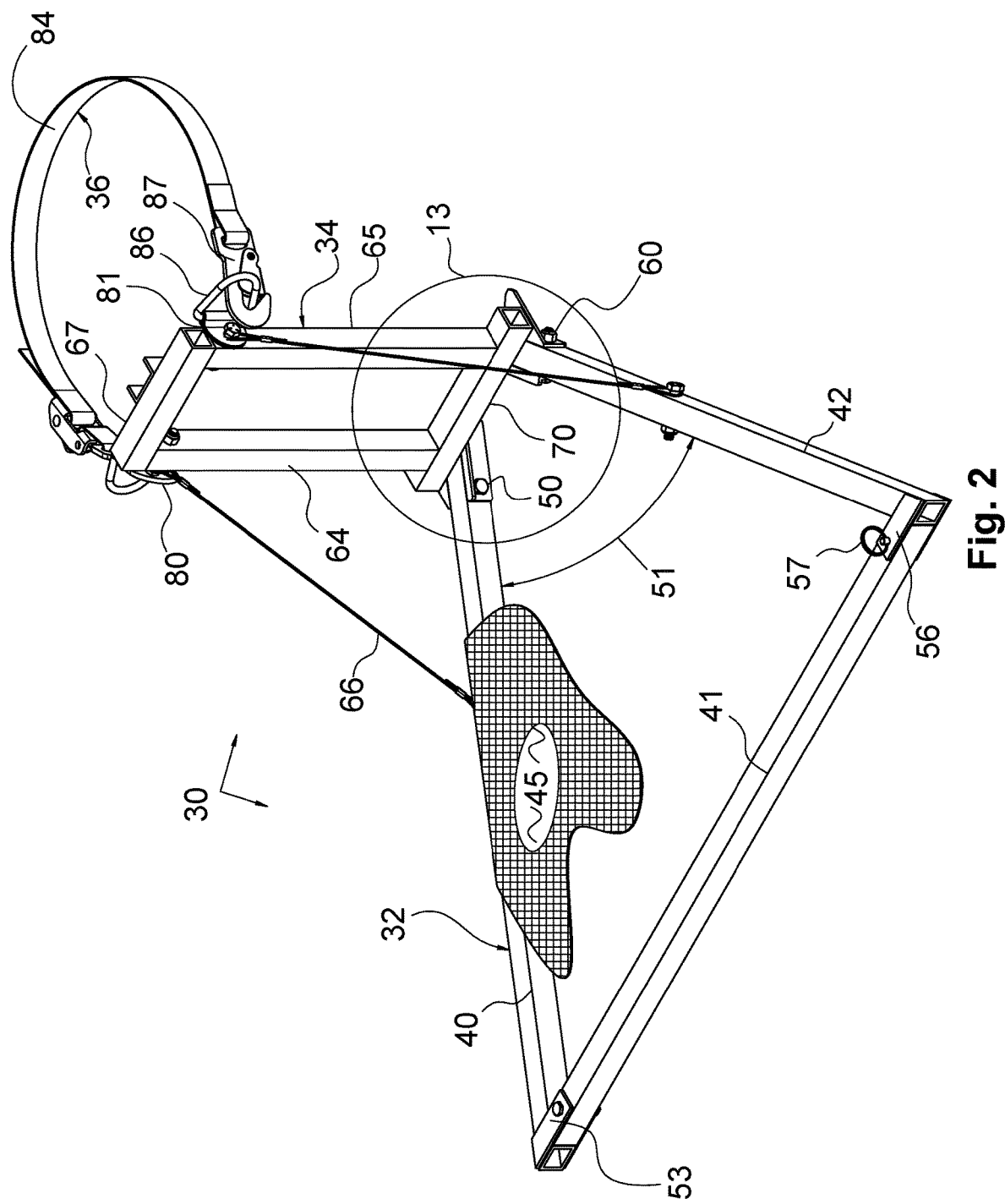
FIG. 2 is a frontal right isometric view of the stand of FIG. 1, with portions thereof broken away for brevity.
Figure 19:
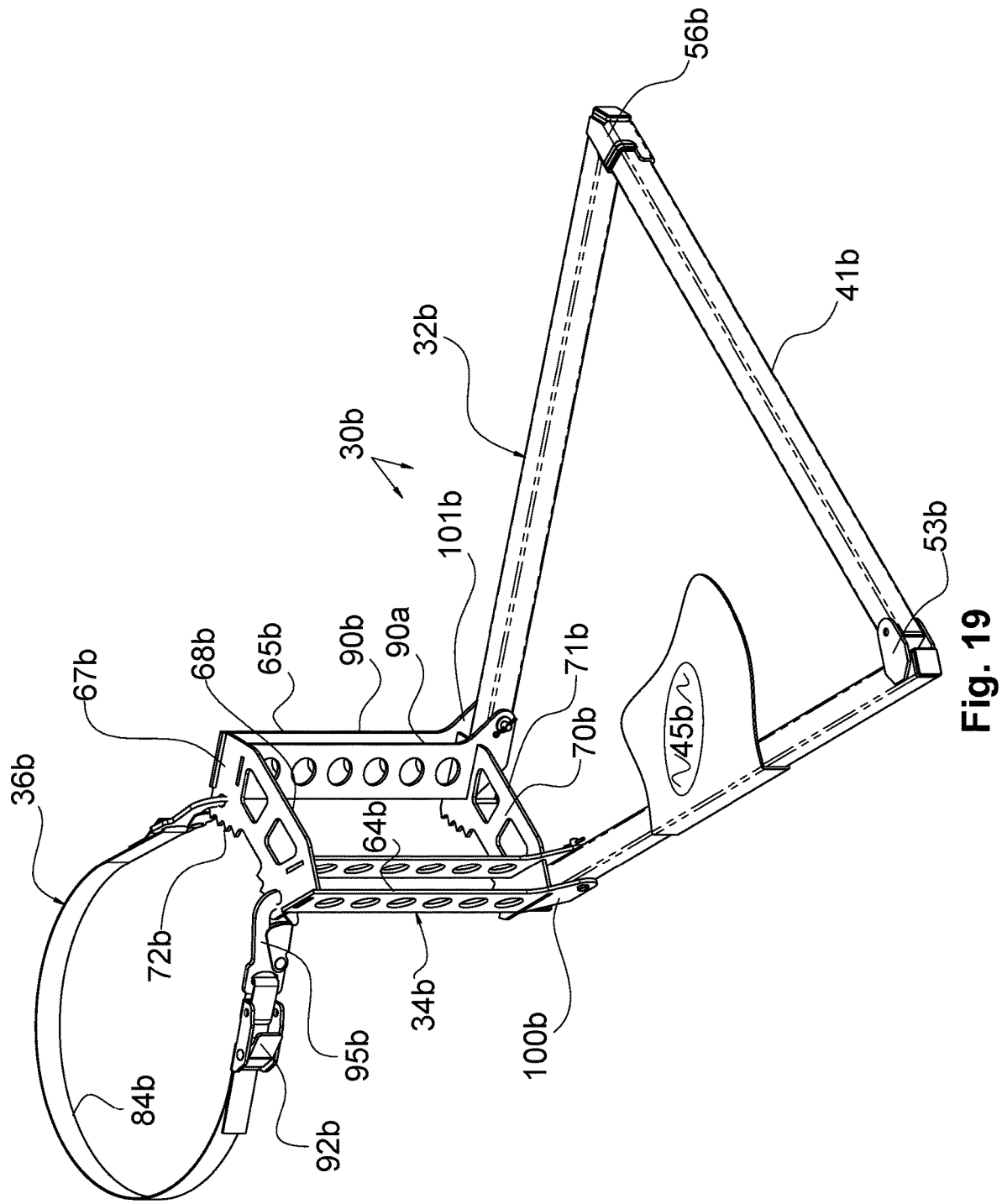
FIG. 19 is a frontal right isometric view of an alternative embodiment of a stand, with portions thereof broken away for brevity; and, FIG. 20 is a centered, frontal isometric view of the alternative stand embodiment of FIG. 19.
Figure 20:
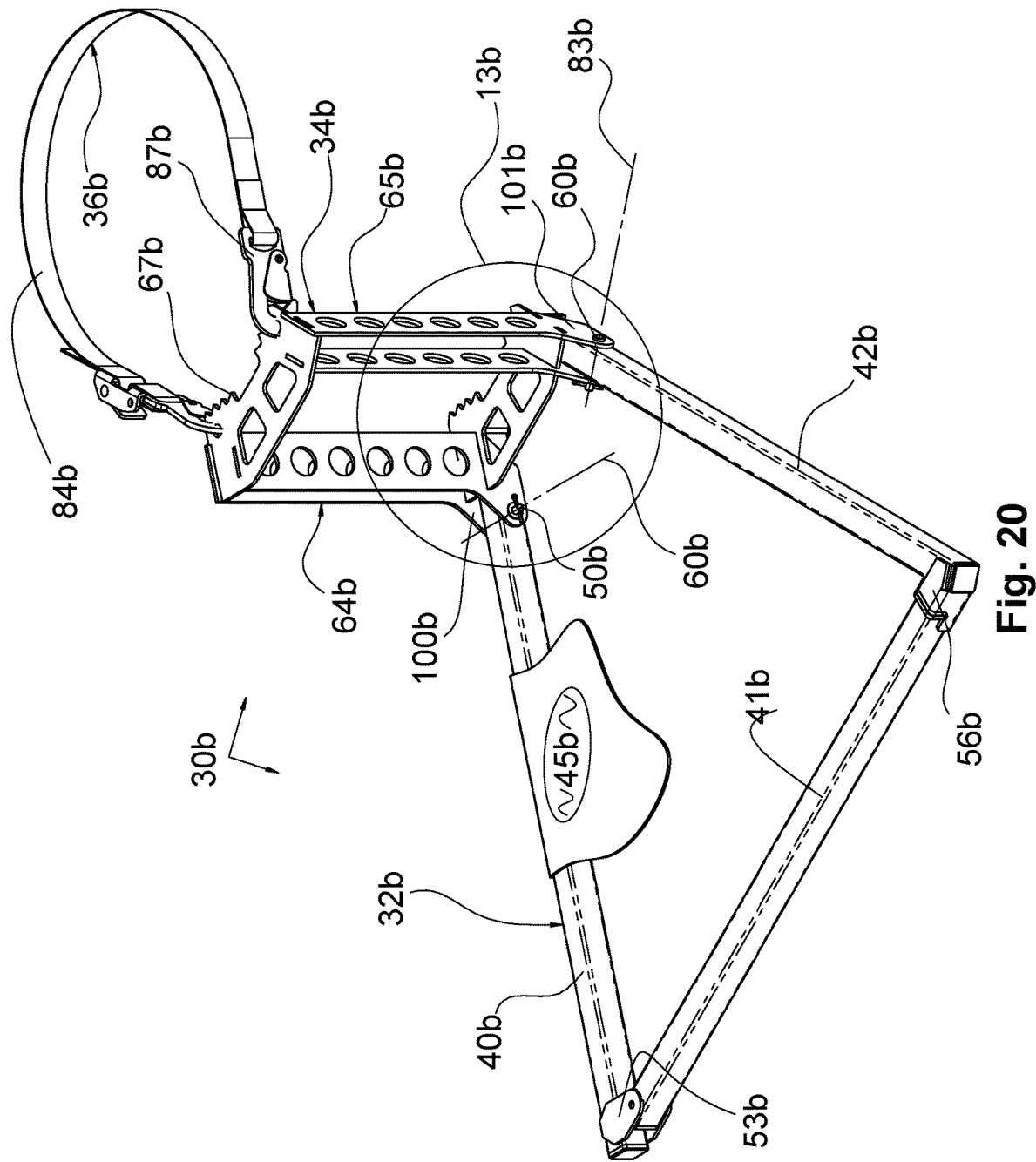

With initial reference directed now to FIGS. 1 and 2 of the appended drawings, a portable and foldable hunting stand constructed in accordance with the best mode of the invention has been generally designated by the reference numeral 30. FIGS. 19 and 20 show an alternative embodiment 30B. Stand 30 is seen in a deployed configuration in FIGS. 1-3, but it is to be understood that when in use it, will be conventionally secured to a vertical support such as a tree proximate a hunting region. The stand 30 comprises a deployable platform 32 that is foldably coupled to a rigid, box-like, generally rectangular frame 34. When deployed the seat is generally in the shape of a trapezoid. The rear frame 34 forms a back of the stand. The rear frame 34 is adapted to be fastened to a tree or vertical support (not shown) when in use by an encircling band 36. The frame 34 may be covered with a suitable backing pad (not shown) for comfort when platform 32 is used as a seat.

Figure 10:
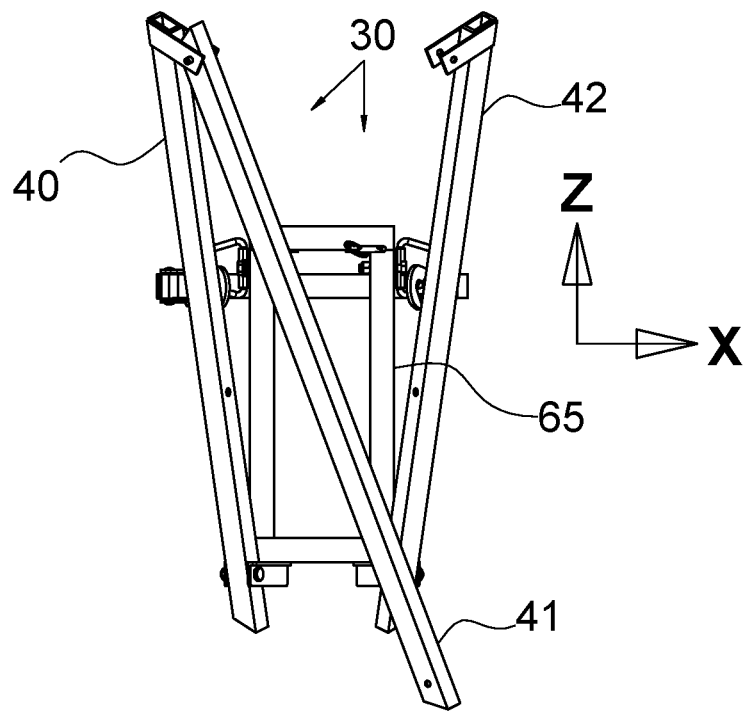
FIG. 10 is a front plan view of the stand as seen in FIG. 9.
Figure 11:
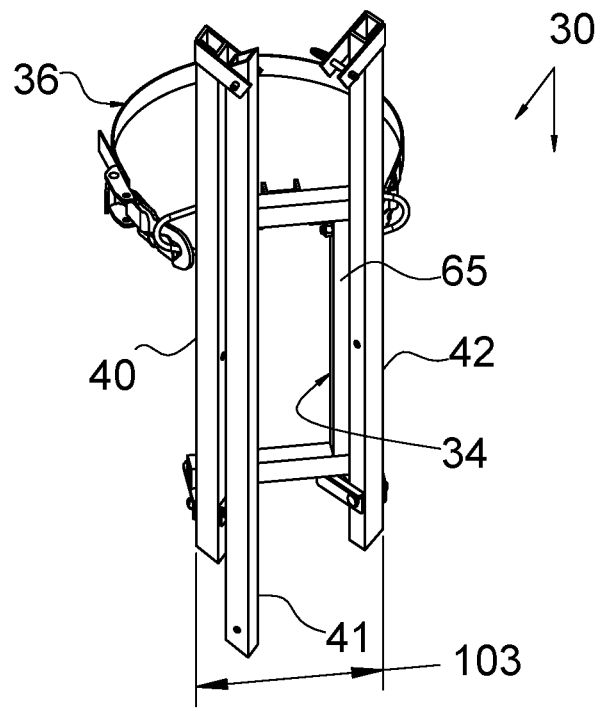
FIG. 11 us a frontal isometric view of the stand fully folded and disposed in a fully retracted, transportable, collapsed configuration.
Figure 12:
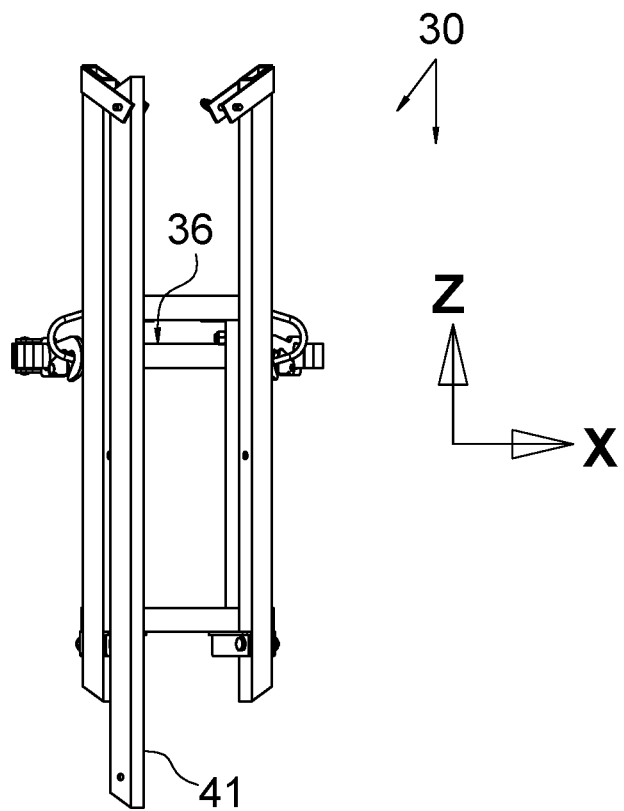
FIG. 12 is a front plan view of the stand of FIG. 11.
Figure 13:
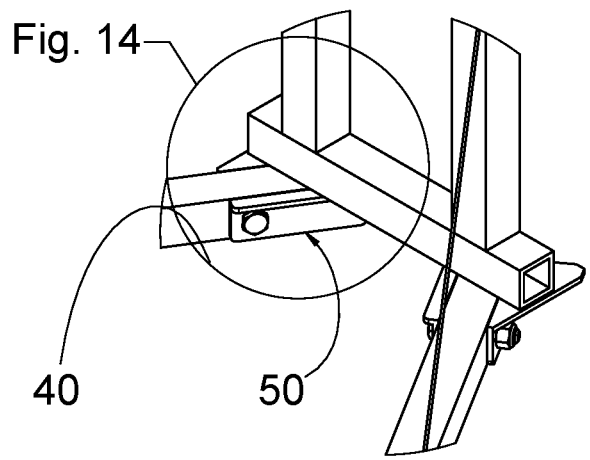
FIG. 13 is an enlarged, fragmentary isometric view of critical hinge structure, derived from circled region "13" in FIG. 2.

The platform 32 comprises a pair of rigid, tubular platform struts 40, 42 that form rigid, diverging platform sides. A pivoted traversing strut 41 (FIGS. 1, 2) can be deployed to couple the outer ends of the platform struts 40, 42, to form a generally trapezoidal platform configuration. A preferably fabric or plastic covering 45 is thereafter unfolded and stretched between and over the platform struts 40 and 42 and traversing strut 41 to form a supporting surface. The platform struts 40 and 42 form outwardly diverging sides of the platform when the stand is deployed (i.e., FIG. 3). A first critical hinge 50 secured beneath frame 34 is pivotally coupled to an inner end of platform strut 40 (i.e., FIGS. 1, 3, 14). The opposite, outer end of the strut 40 is coupled via a hinge 53 (FIG. 1) to a traversing strut 41 that connects the outer ends of struts 40 and 42 when the stand 30 is deployed. To deploy the stand the opposite end of the connecting traversing strut 41 is pinned to the outer end of strut 42 with a pin 57 that penetrates end bracket 56 (FIG. 2). The inner end of the opposite platform strut 42 is coupled by a critical pivot hinge 60 (FIGS. 1-3, 15) disposed beneath an opposite side of the frame 34. Hinge 60 functions similarly to the complementary strut hinge 50; in both cases the platform struts attached thereto can fold and pivot downwardly and outwardly for deployment as in FIGS. 1-3, or they can be retracted to parallel, vertical positions (FIG. 11). Thus hinges 50 and 60 enable the struts 40 and 42 respectively to be rearwardly retracted to dispose the stand 30 in a reduced dimension, collapsed position for transportation as illustrated in FIG. 11. When deploying or retracting the stand 30, its various parts assume the positions illustrated in FIGS. 6-11.

Referencing FIG. 3, when platform struts 40 and 42 are properly unfolded for deployment, they are essentially disposed horizontally in a plane spaced above the ground; struts 40 and 42 then form an angle 51 (FIG. 2) between them that preferably is between thirty and one hundred and fifty degrees, as discussed further below. Struts 40, 41 and 42 thus establish a generally trapezoidal platform configuration (i.e., FIG. 3). On the other hand when struts 40 and 42 are folded into the transport position seen, for example in FIG. 11, they are vertically disposed in a spaced-apart, side-by-side, generally parallel transportation orientation.

Figure 3:
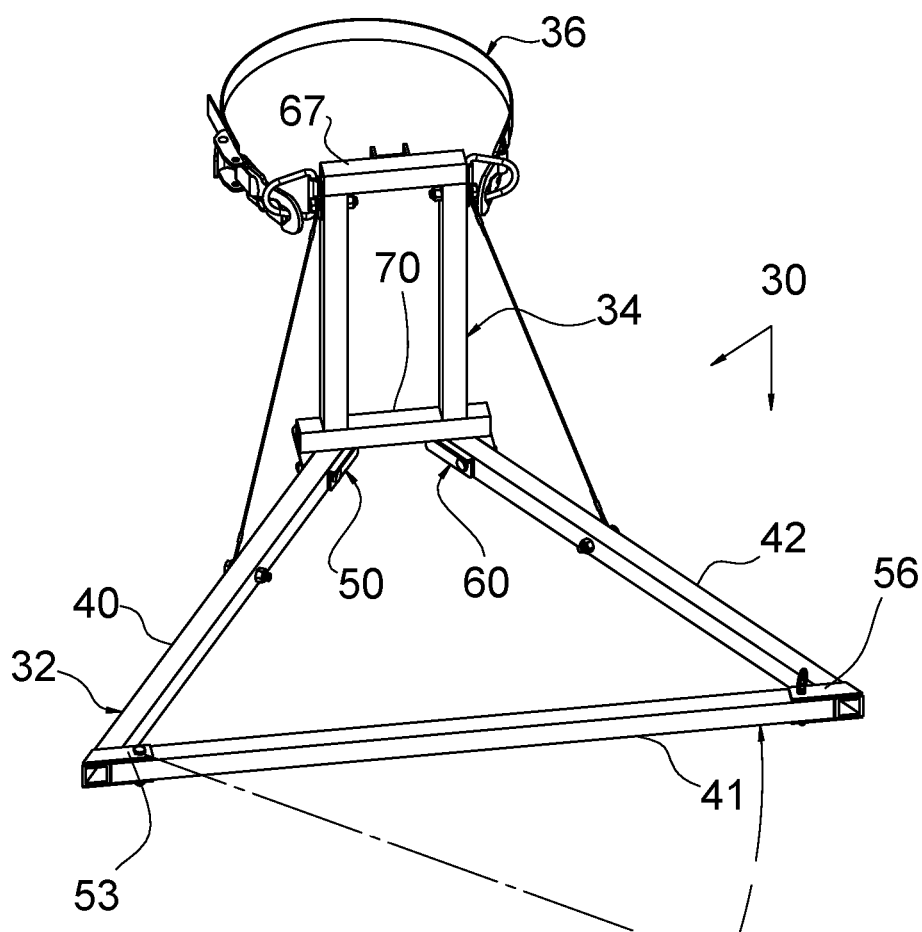
FIG. 3 is a centered, frontal isometric view of my new stand.

It can be seen that by comparing FIGS. 3 and 11, for example, that bulk can be reduced by folding. The outside dimensions of the retracted stand when disposed for transportation are smaller than the larger, platform-deployed dimensions of the configuration of FIGS. 1-3. When the stand 30 is deployed and suspended from a tree, the flexible, spaced apart, preferably wire suspension lines 66 support and brace the platform 32 in a generally horizontal orientation.

The rigid frame 34 is adapted to be firmly coupled to a tree or other vertical support. Frame 34 preferably comprises a pair of spaced-apart sides formed by rigid, spaced apart and parallel stanchions 64 and 65 (FIG. 1) that extend vertically between a transverse portion comprising a backing top 67 and a lower, transverse portion comprising a backing bottom 70. A plurality of barbs or teeth 72 (FIG. 1) may project rearwardly from the frame (i.e., from backing top 67) to forcibly engage a tree trunk when the stand is deployed. A pair of tabs 80 and 81 (i.e., FIG. 2) are respectively disposed at the tops of the frame on stanchions 65 and 64. Each of these tabs supports a caribiner 86 (FIG. 2) or 97 (FIG. 1) for attaching the encircling supporting band 36.

The band 36 preferably comprises a flexible, encircling strap 84 of reinforced fabric material. Alternatively, it could be made of metal or chain or the like. One end of the strap 84 terminates in a hook 87 (FIG. 2) for engaging a caribiner 86 that is pivotally secured to tab 81. The opposite end of the band 84 is entrained within an adjustable buckle 92 that couples to a hook 95 engaging a caribiner 97 that is pivotally secured to tab 80 (FIG. 1). A variety of conventional straps, tabs and hooks may be used instead of the illustrated preferred structure.

Figure 4:
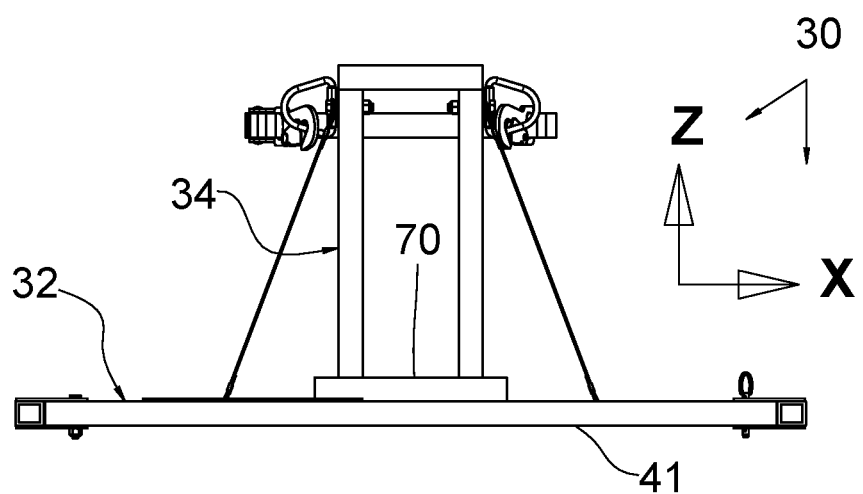
FIG. 4 is a front plan view thereof.
Figure 5:
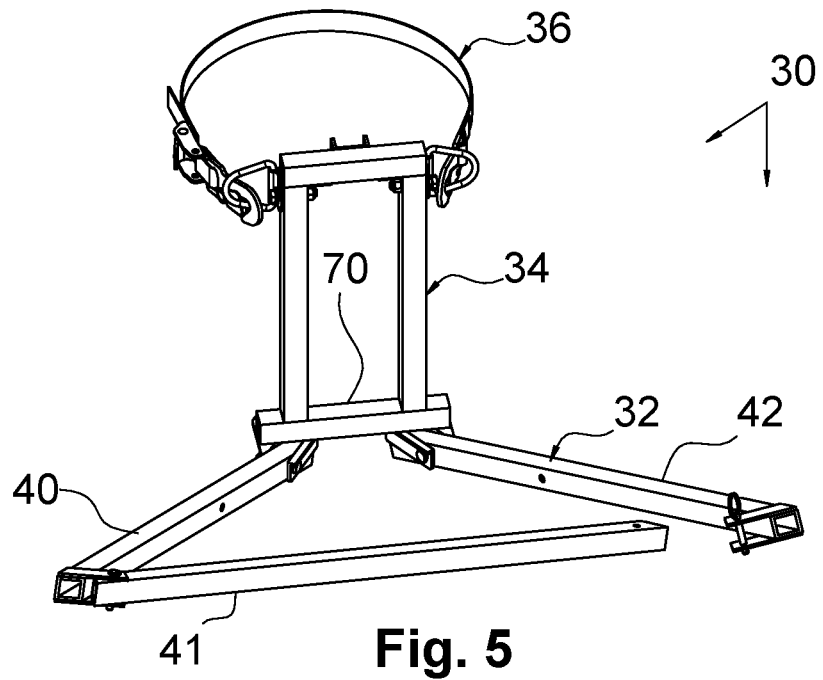
FIG. 5 is a front isometric view of the stand in a partially disassembled state.
Figure 6:
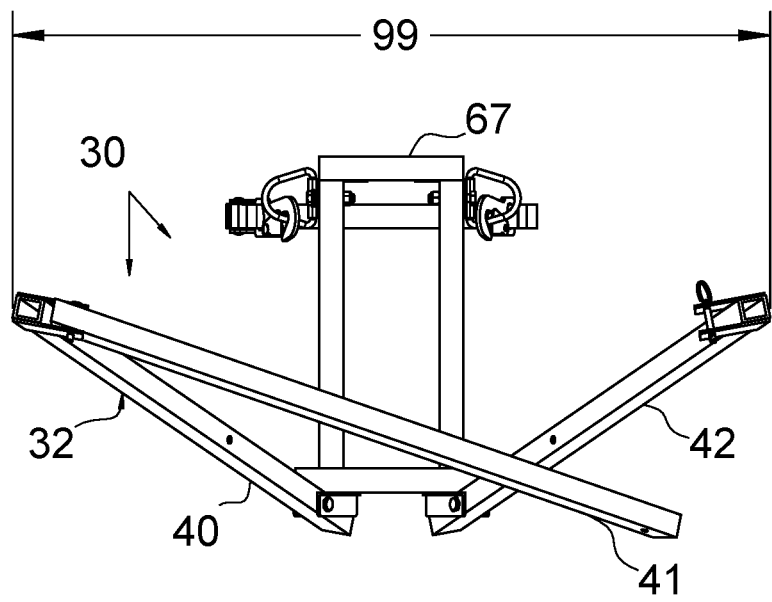
FIG. 6 is a front plan view of the stand in an intermediate position assumed as it is further collapsed for transport.
Figure 7:
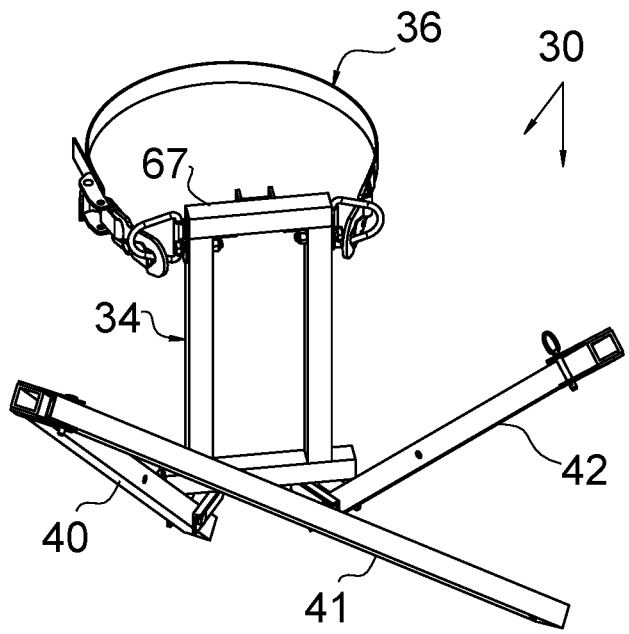
FIG. 7 is an elevational view of the stand as seen in FIG. 6.
Figure 8:
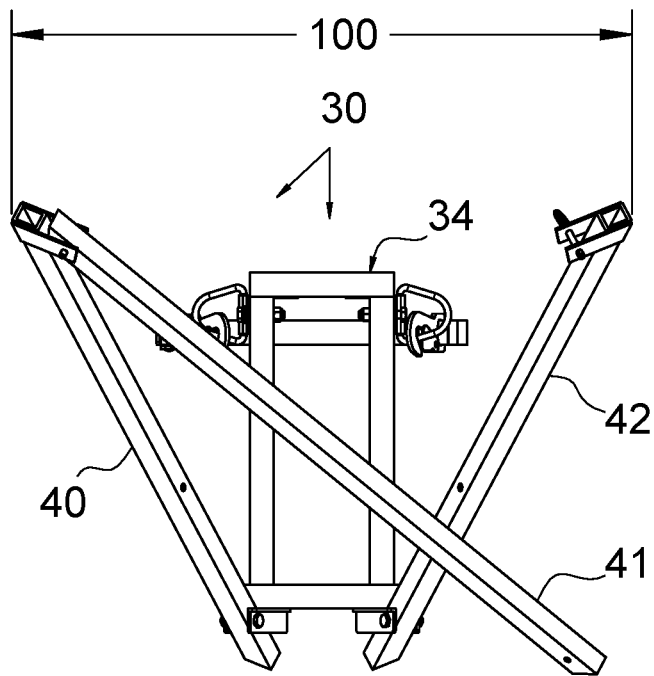
FIG. 8 is a front plan view of the stand in a further collapsed state.
Figure 9:
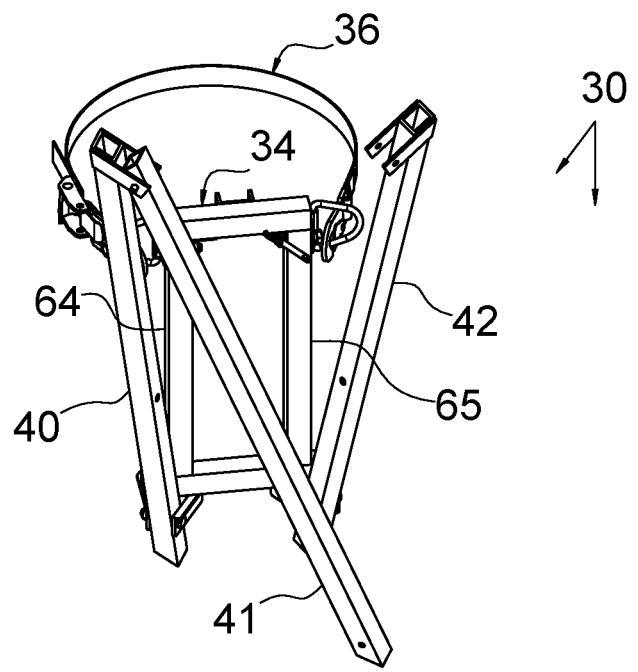
FIG. 9 is a frontal isometric view of the stand substantially folded into a partially collapsed and retracted, transportable state.

FIGS. 3 and 4 show the assembled stand 30 in a deployed, user configuration just prior to beginning the collapsing process for transporting the stand after a hunt. FIG. 5 shows the traversing strut 41 that normally joins platform struts 40 and 42 when the stand is deployed, unpinned and disconnected from strut 42. Further folding is illustrated in FIGS. 6-8, wherein, after traversing strut 41 has been disconnected from strut 42, so the struts 40 and 42 and be folded upwardly. As the position of FIG. 6 is transformed to that of FIG. 8, the width 99 (FIG. 6) of the stand 30 reduces to the shorter width 100 (FIG. 8) finally reaching width 103 (FIG. 11). Further folding is illustrated in FIGS. 9-11. It is to be noted that in FIG. 11, the minimum width 103 is assumed, with the platform struts 40 and 42 are folded rearwardly assuming a parallel orientation relative to the frame stanchions 64 and 65 for convenient carrying and transportation of the stand 30.

Figure 14:
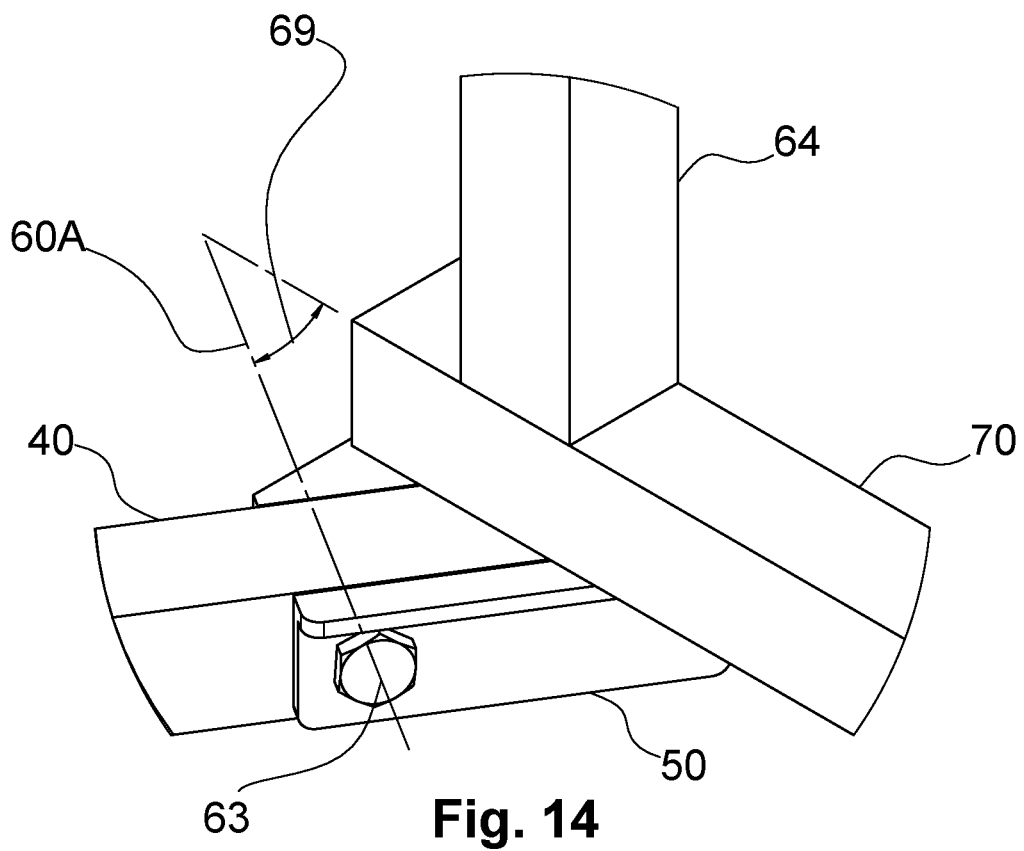
FIG. 14 is an enlarged, fragmentary isometric view of circled region 14 seen in FIG. 13.
Figure 15:
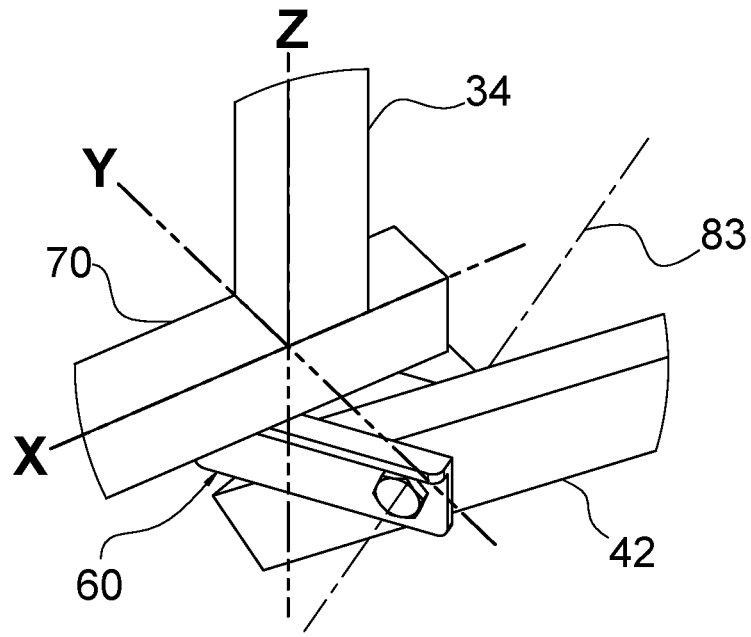
FIG. 15 is a fragmentary isometric view similar to FIG. 14, but showing the reference axes' of the X-Y, Y-Z, and X-Z reference planes.
Figure 16:
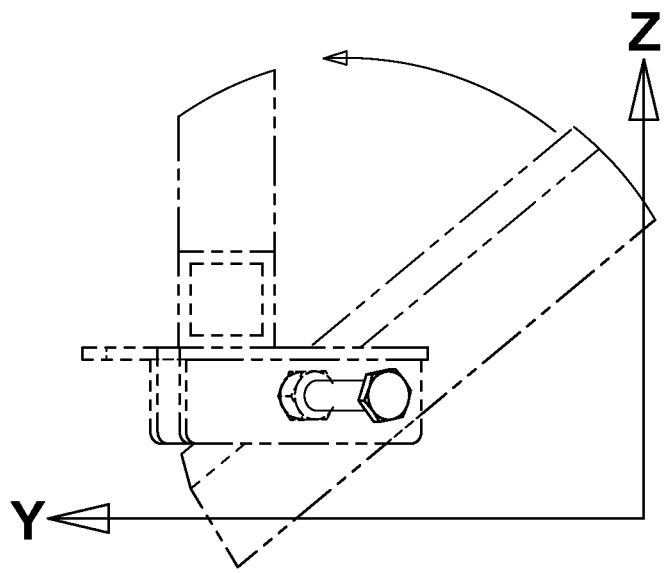
FIG. 16 is a fragmentary plan view showing a hinge axis in the Y-Z reference plane.
Figure 17:
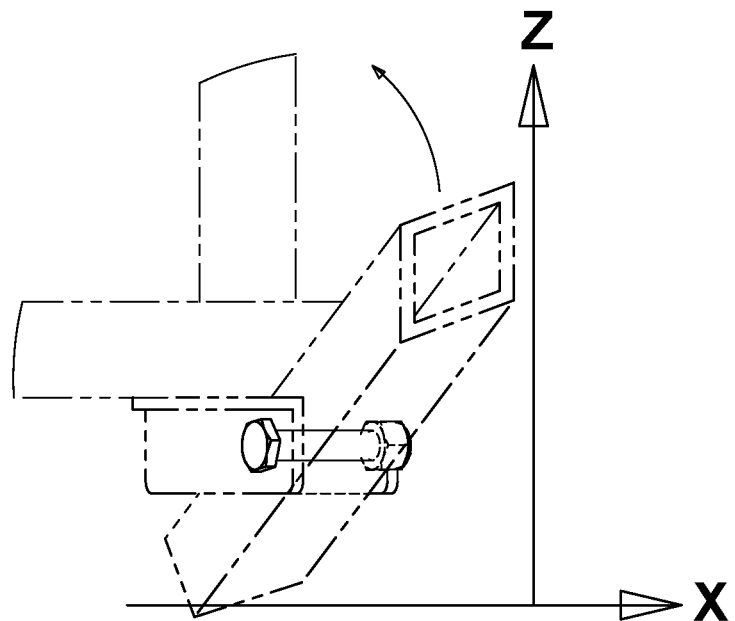
FIG. 17 s a fragmentary plan view showing a hinge axis in the X-Z reference plane.

FIGS. 14 and 15 are enlargements that help define a three dimensional reference coordinate system for the stand. The Z axis is vertical, corresponding with the frame stanchions orientation. The Y axis established the thickness of the frame etc. The deployed seat occupies the X-Y axis when the stand is erected. Referencing FIG. 14, the first critical hinge 50 has a hinge pin 63 establishing a pivot axis 60A that enables pivoting and rotation of platform strut 40. Preferably hinge axis 60A forms an acute angle 69 (FIG. 14) relative to the frame, and frame bottom 70. In the best mode angle 69 is between twenty to sixty degrees, preferably thirty-two degrees. Axis 60A occupies a plane that is parallel with and spaced below the plane occupied by frame bottom 70. Platform strut 42 is angled in an opposite direction to diverge from strut 40.

Figure 18:
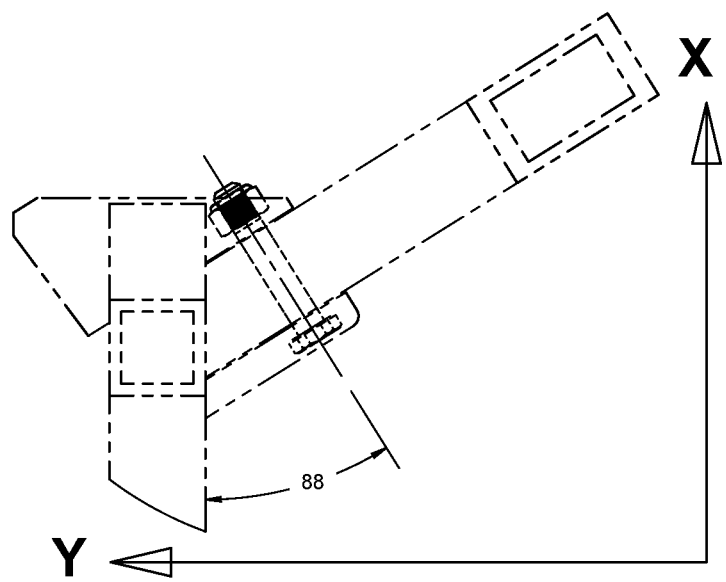
FIG. 18 is a fragmentary plan view showing a hinge axis in the Y-X reference plane.

Platform strut 42 is pivoted with a hinge 60 (FIGS. 2, 15) establishing an axis of rotation 83 (FIG. 15), forming an acute, outwardly diverging strut angle 88 (FIG. 18) relative to frame 34 and/or frame bottom 70. Acute angle 88 is preferably the same magnitude as angle 69. Preferably each axis of rotation 60A (FIG. 14) and 83 (FIG. 15) form the same acute angle 69 or 88 of approximately thirty two degrees relative to frame bottom 70, but the platform struts 40, 42 extend away in opposite directions so that the struts 40, 42 outwardly diverge when foldably deployed. Preferably the deployed struts 40, 42 form angle 51 (FIG. 2) between them that is preferably between sixty to one hundred and fifty degrees. In the best mode known at this time angle 51 is obtuse, and measures approximately 116 degrees. The struts 40 and 42 are not parallel when the stand is deployed.

Referencing FIGS. 19 and 20, an alternative embodiment of the stand has been generally designated by the reference numeral 30B. All of the reference numerals showing structure similar to that already discussed have been labeled with the suffice "B" for simplicity. However, the previously discussed backing top 67 has been replaced by an upper backing plate 67B, that has a flat forward transverse edge 68B. The lower transverse backing bottom 70 of embodiment 30 has been replaced with lower backing plate 70B that has a transverse edge 71B parallel with edge 68B above it. Each stanchion 64 and 65 has been replaced with vertical supports 64B and 65B, each of which comprises a pair of spaced apart, perforated vertical plates 90A and 90B all having heel portions 100B or 101B at their bottoms that establish a pivot axis 60B and pivot axis 83B that are function identically with axis 60A and axis 83 discussed above. The angle of incline of axis 60B and axis 83B are the same as axis 60A and axis 83, and the angular magnitude is measured in reference to the backing plate edges 68B and/or 71B.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations.

As many possible embodiments may be made of the invention without departing from the scope thereof, it is to be understood that all matter herein set forth or shown in the accompanying drawings is to be interpreted as illustrative and not in a limiting sense.

What is claimed is:

1. A portable, foldable and collapsible hunting stand comprising:
   a rigid supporting frame adapted to be firmly coupled to a tree or other vertical support, the frame comprising a pair of rigid, spaced apart and parallel stanchions that are normally vertically oriented when the stand is deployed, and a transverse top and a spaced apart, lower, parallel transverse bottom, said transverse top and said transverse bottom extending between said parallel frame stanchions;
   a selectively deployable platform adapted to be folded between a generally vertical transportation configuration and a generally horizontal, deployed configuration, the platform comprising:
      a first retractable platform strut pivoted relative to said frame with a first hinge having a first axis of rotation forming a first acute angle relative to the frame;
      a second retractable platform strut pivoted relative to said frame with a second hinge having a second axis of rotation forming a second acute angle relative to the frame, the second platform strut angled away from the first platform strut;
      wherein said first hinge axis of rotation is neither parallel with nor colinear with said second hinge axis of rotation;
   whereby the platform struts are disposed in generally parallel relation when the hunting stand assumes the transportation configuration, and the platform struts outwardly diverge from each other when the platform is disposed in said generally horizontal, deployed configuration, and;
   a selectively deployable traversing strut adapted to extend between said first and second platform struts when the stand is deployed.

* * * * *